(12) United States Patent  
Morin

(10) Patent No.: US 6,964,448 B2
(45) Date of Patent: Nov. 15, 2005

(54) SNOWMOBILE COVER

(75) Inventor: Andre Morin, St-Nicephore (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 10/865,785

(22) Filed: Jun. 14, 2004

(65) Prior Publication Data
US 2004/0251708 A1    Dec. 16, 2004

Related U.S. Application Data

(60) Provisional application No. 60/477,359, filed on Jun. 11, 2003.

(51) Int. Cl.⁷ ............................................... B60J 11/00
(52) U.S. Cl. ............................ 296/136.07; 296/136.1; 280/770; 150/166
(58) Field of Search ...................... 296/136.01, 136.07, 296/136.08, 136.1; 280/770; 150/166; 114/361

(56) References Cited

U.S. PATENT DOCUMENTS

| | | | |
|---|---|---|---|
| 1,728,437 A * | 9/1929 | Mott | ........................... 150/166 |
| 3,603,419 A * | 9/1971 | Riddle | ........................... 280/17 |
| 5,368,912 A * | 11/1994 | Reaves | ........................ 428/192 |
| 5,458,945 A | 10/1995 | Tall | |
| 6,070,629 A * | 6/2000 | Whiteside | ................... 150/166 |
| 6,129,408 A | 10/2000 | Schultz | |
| 6,478,363 B2 | 11/2002 | Jensen | |
| 2002/0109373 A1 * | 8/2002 | Jensen | ........................ 296/136 |

* cited by examiner

Primary Examiner—Patricia L. Engle
(74) Attorney, Agent, or Firm—BRP Legal Services

(57) ABSTRACT

A cover for protecting and covering at least an upper portion of a snowmobile, includes an upper weatherproof portion and a fastening strap for securing the upper weatherproof portion to the snowmobile. A lower lip of the upper weatherproof portion circumscribes an elongated lower opening and defines therein a passage which extends at least partially around the lower lip. Strap openings which communicate with the passage are disposed on each of opposed lateral sides of the lower lip. The fastening strap is disposed within the passage and has free ends which project out from the strap openings. Each of the free ends has a length which permits it to be crossed under the snowmobile and fastened to the lower lip on a lateral side thereof opposite from that of the strap opening from which the free end projects. Fastening members removably attach the free ends to the lower lip.

18 Claims, 4 Drawing Sheets

SNOWMOBILE COVER

This application claims the benefit of priority to U.S. Provisional Application No. 60/477,359, filed on Jun. 11, 2003, the entire contents of which are incorporated herein by reference.

TECHNICAL FIELD

The present invention relates generally to a protective cover for a vehicle, and more particularly relates to a snowmobile cover.

BACKGROUND OF THE INVENTION

As snowmobiles are often transported by a trailer towed by a road vehicle, unprotected snowmobiles can be exposed to deleterious elements such as ice and corrosive matter, such as salt and sand, which can spray up with slush from road vehicles. Further, whether stored inside or outside, snowmobiles are preferably covered when not in use in order to keep their surfaces clean and to protect them from moisture, dust, dirt or other such elements which can soil, cause corrosion, or otherwise prematurely wear the snowmobile. Accordingly, many different types of covers for snowmobiles are known, all of which generally provide protection for the snowmobile during transportation or storage thereof.

Soft, lightweight covers are often used as they can easily be folded up and stored away when not in use. Such conventional covers generally comprise a large upper portion made of a nylon or similarly weatherproof material which is sized and fitted to slide overtop of the entire upper body portion of the snowmobile, generally covering the forward fairings of the external shell and the rear seat portion. Typically, the skis and track are left uncovered by this type of cover.

Such conventional soft snowmobile covers are generally secured to the snowmobile by lateral straps which extend from one side of the opening in the upper weatherproof covering portion, and are adapted to transversely extend beneath the snowmobile for fastening engagement with the cover on the opposite side of the snowmobile. However, in order to accomplish this, the person installing the cover generally has to kneel down and extend their arm, holding the strap, under the snowmobile and through the rear suspension system, in order to thread the strap through to the other side of the snowmobile where, once the person has gone around to the other side of the snowmobile, it can be fastened to the opposite edge of the cover. This procedure has to be repeated for each strap which is to be passed under the snowmobile. As most such covers comprise three or four straps to ensure that the cover is adequately secured to the vehicle, this process can be time consuming.

When the snowmobile has been stored outside or has recently been used, the rear suspension is normally icy and full of snow, which can further make it difficult to pass ones arm beneath the snowmobile in order to feed the strap across to the other side of the vehicle.

Further, removal of this type of cover can also present inconveniences. Particularly, fastening straps which extend through the track and rear suspension system can be difficult to disengage and remove, as the attachment clips disposed on their ends tend to hook onto, or otherwise become entangled with, elements of the rear suspension system. This therefore makes removal of the fastening straps from beneath the rear portion of the snowmobile inconvenient, as extra care must be taken in order to ensure that their removal from beneath the snowmobile occurs without hindrance.

Other soft snowmobile covers are also known to employ a strap which extends around the perimeter of the cover, having ends which meet at a point, such as the rear of the snowmobile, for fastening together. The strap can then be drawn taught to hold the perimeter of the cover as close to the snowmobile as possible, thereby preventing wind or snow from entering the cover or blowing the cover off the snowmobile. However, regardless of how tight the full perimeter strap on this type of cover is pulled, it does not provide as secure an attachment to the snowmobile in comparison with a cover which has lateral straps which transversely extend beneath the snowmobile.

Thus, there remains a need for a soft, lightweight snowmobile cover which can be more easily and quickly installed on a snowmobile, while nevertheless being securely fastenable thereto.

SUMMARY OF THE INVENTION

It is an object of the present invention to provide an improved snowmobile cover which is more easily and quickly securable to a snowmobile.

Therefore, in accordance with the present invention, there is provided a cover for protecting and covering at least an upper portion of a snowmobile, the cover comprising: an upper weatherproof portion defining an elongated lower opening therein shaped to correspond to the snowmobile, and having a lower lip circumscribing the elongated lower opening and defining therein a passage extending at least partially there-around, the lower lip defining strap openings communicating with the passage and disposed on each of opposed lateral sides of the lower lip; a fastening strap for securing the upper weatherproof portion to the snowmobile, the fastening strap being disposed within the passage and having free ends projecting out from the strap openings, each of the free ends of the fastening strap having a length which permits it to be crossed under the snowmobile and fastened to the lower lip on a lateral side thereof opposite from that of the strap opening from which the free end projects; and fastening members for removably attaching the free ends to the lower lip.

There is also provided, in accordance with the present invention, a snowmobile in combination with a cover for protecting and covering at least an upper portion thereof, comprising: the snowmobile including a frame having an engine and a seat disposed thereon; two skis linked to the frame by front suspension systems; a drive track disposed below the frame and being operatively connected to the engine for propulsion of the snowmobile; a steering device being operatively connected to the engine for steering the snowmobile; and the cover including an upper weatherproof portion defining an elongated lower opening therein shaped to correspond to the snowmobile and having a lower lip circumscribing the elongated lower opening, the lower lip defining therein a passage extending at least partially therearound and strap openings communicating with the passage and disposed on each of opposed lateral sides of the lower lip; a fastening strap for securing the upper weatherproof portion to the snowmobile, the fastening strap being disposed within the passage and having free ends projecting out from the strap openings, each of the free ends of the fastening strap having a length which permits it to be crossed under the snowmobile and fastened to the lower lip on a lateral side thereof opposite from that of the strap opening from which the free end projects; and fastening members for removably attaching the free ends to the lower lip.

There is further provided, in accordance with the present invention, a method of installing a cover on a snowmobile comprising the steps of: providing a cover for protecting and covering at least an upper portion of the snowmobile, the cover having an upper weatherproof portion defining an elongated lower opening therein shaped to correspond to the snowmobile and having a lower lip circumscribing the elongated lower opening, the lower lip defining therein a passage extending at least partially there-around, the cover comprising a fastening strap for securing the upper weatherproof portion to the snowmobile, the fastening strap being disposed within the passage and having free ends projecting outward from strap openings defined in lateral sides of the lower lip; sliding the upper weatherproof portion over the snowmobile; engaging an end of the upper weatherproof portion having the passage therein to a first end of the snowmobile; crossing both of the free ends of the fastening strap beneath a second end of the snowmobile; and removably fastening each of the free ends of the fastening strap to the upper weatherproof portion on a lateral side thereof opposite that of the strap opening from which the free end projects.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENT

Figure 1:
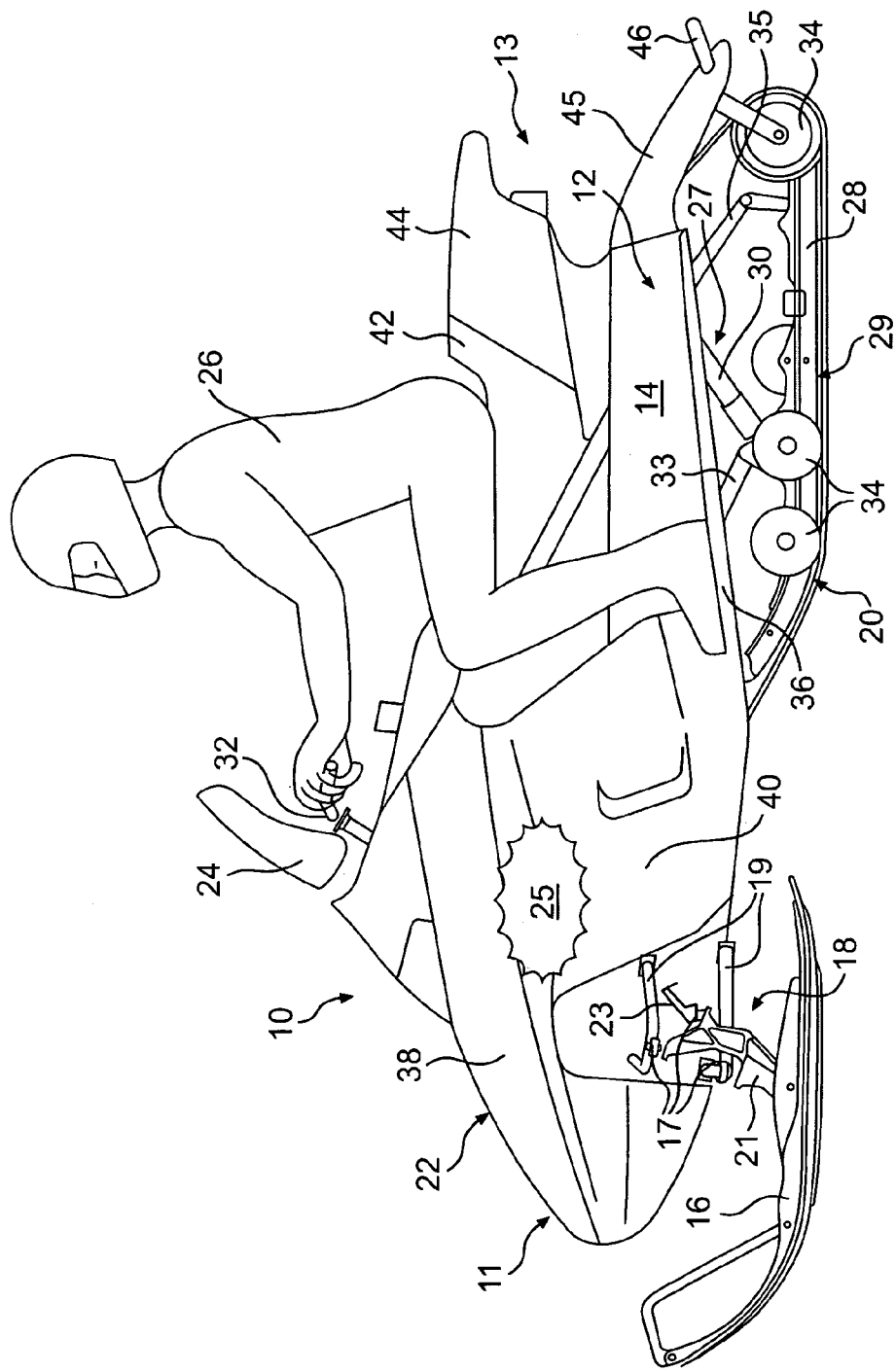
FIG. 1 is a side elevation schematic of a typical snowmobile.

FIG. 1 shows a typical snowmobile 10 having a forward end 11 and a rearward end 13, defined consistently with a travel direction of the vehicle. The snowmobile 10 includes a chassis or frame 12 which normally includes a rear tunnel portion 14, a front engine cradle portion (not shown), and a front suspension assembly portion (not shown). While hidden behind the fairings 22 in FIG. 1, an engine 25, which provides motive force for the vehicle, is supported by the engine cradle portion of the frame 12. In addition, two front skis 16 are attached to the forward end of the frame 12 through a front suspension system 18. The front suspension system 18 generally comprises a double A-arm type suspension, having two A-arms 19 on either side of the vehicle, which link a ski leg 21 with the frame 12. The ski legs 21 are attached the skis 16 at a lower end and to the upper and lower A-arms 19 at an upper end thereof. The ski leg 21 preferably includes three ball joints 17 at the attachment points with the upper and lower A-arms 19 and with the steering rod 23. The steering rod 23 rotates the ski leg 21 about an axis defined between the ball joints 17 between the ski leg 21 and the A-arms 19, to rotate the skis 16. The steering rods 23 are linked to a steering device 32, such as a handlebar, which is positioned forward of a rider for providing directional control of the snowmobile 10. Thus, by turning the steering device 32, the ski legs 21 are pivoted, thereby turning the skis 16 to steer the vehicle in a desired direction.

A drive track 20 is disposed under tunnel 14 of the frame 12 and is operatively connected to the engine 25 for propulsion of the snowmobile 10. A rear suspension system 27 comprises two parallel aluminum slide rails 28, which generally position and guide the endless drive track 20 and which include idler wheels 34 engaged thereto. The slide rails 28 include a slide 29 covering the lower surfaces thereof to reduce contact friction between the slide rails 28 and the drive track 20. The slide 29 is preferably made of Ultra High Molecular Weight Polyethylene (UHMWPE). The rear suspension system 27 also includes one or more shock absorbers 30, which may also include a coil spring. Forward and rear suspension arms 33 and 35 of the rear suspension system 27 attach the slide rails 28 to the frame 12.

At the front of the frame 12, the snowmobile 10 comprises an external shell including fairings 22 that enclose the engine 25 to protect it, and which can be decorated to render the snowmobile 10 more aesthetically pleasing. Typically, the fairings 22 comprise a hood 38 and one or more side panels 40. In the particular snowmobile 10 depicted, the side panels 40 open away from the snowmobile along a vertical axis, independently from the hood 38, which pivots forward about a horizontally extending axis. A windshield 24, which may be connected either to the fairings 22 near the forward end 11 of the snowmobile 10 or directly to the handlebars 32, acts as wind deflector to lessen the force of the air on the rider 26 when the snowmobile is moving.

A seat 42 is provided at the rearward end 13 of snowmobile 10 behind the engine 25. A rear portion 44 of the seat 42 may include a storage compartment or can be used to provide a passenger seat. Additionally, a rear grab handle/bumper 46 extends from a rear fairing 45. Two footrests 36 are also positioned on either side of seat 42 to accommodate the rider's feet.

Figure 2:
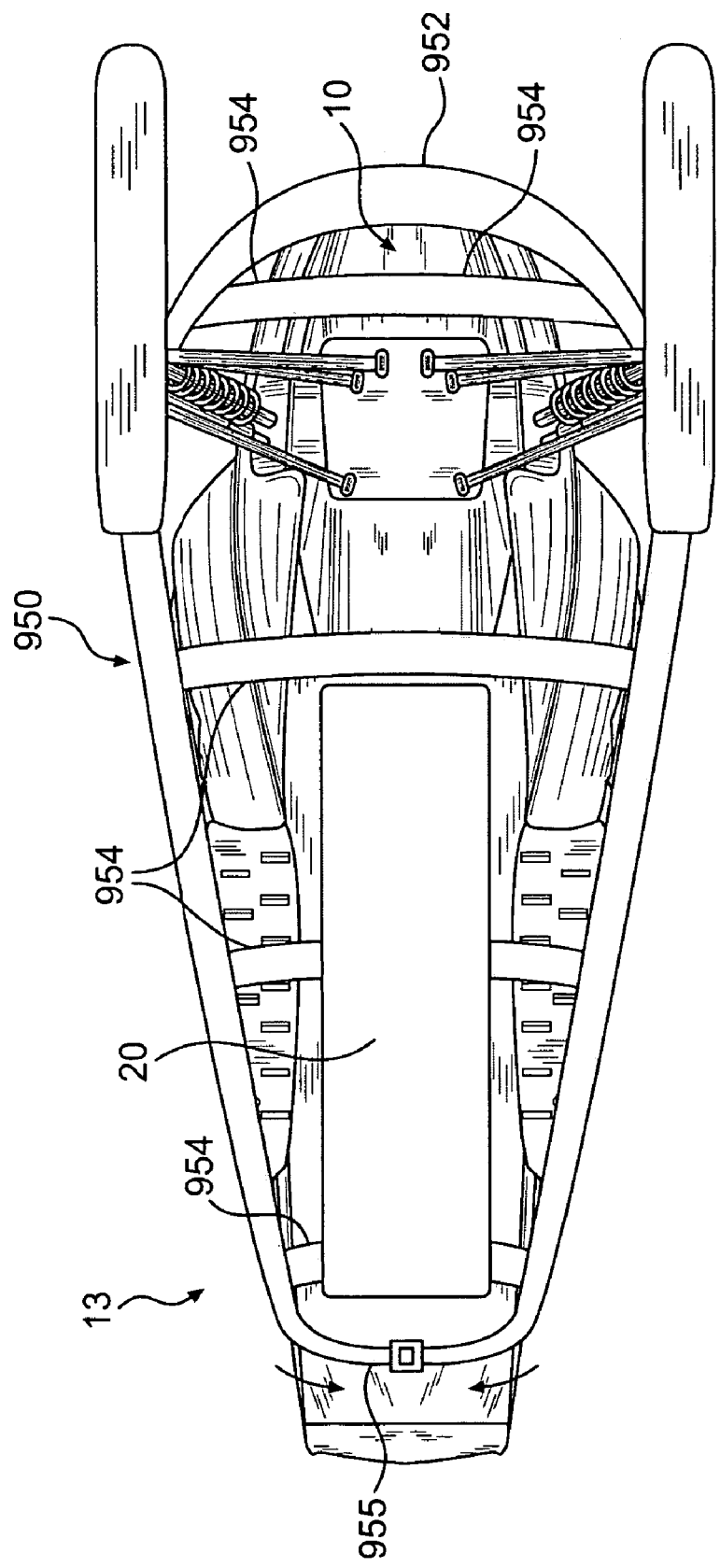
FIG. 2 is a bottom plan view of a snowmobile having a protective cover of the prior art fastened thereto.

Referring to FIG. 2, a protective cover 950 of the prior art is shown engaged to the snowmobile 10. The protective cover 950 comprises an upper weatherproof portion 952 for protecting the snowmobile 10 and several lateral straps 954 that transversely extend beneath the snowmobile 10 for fastening the cover 950 thereto. Particularly, the fastening straps 954 located near the rearward end 13 of the snowmobile 10 must extend through the rear suspension of the snowmobile, passing between the drive track 20, in order to be fastened to the cover 950 on the opposite side of the vehicle. As discussed above, this installation process can be difficult and time consuming.

A further fastening strap 955 is also provided, and generally extends around the perimeter of the upper weatherproof portion 952. The two ends of the fastening strap 955 meet at the rear of the snowmobile 10, and are fastened together such that the strap 955, extending all the way around the vehicle, can be pulled taught.

Figure 3:
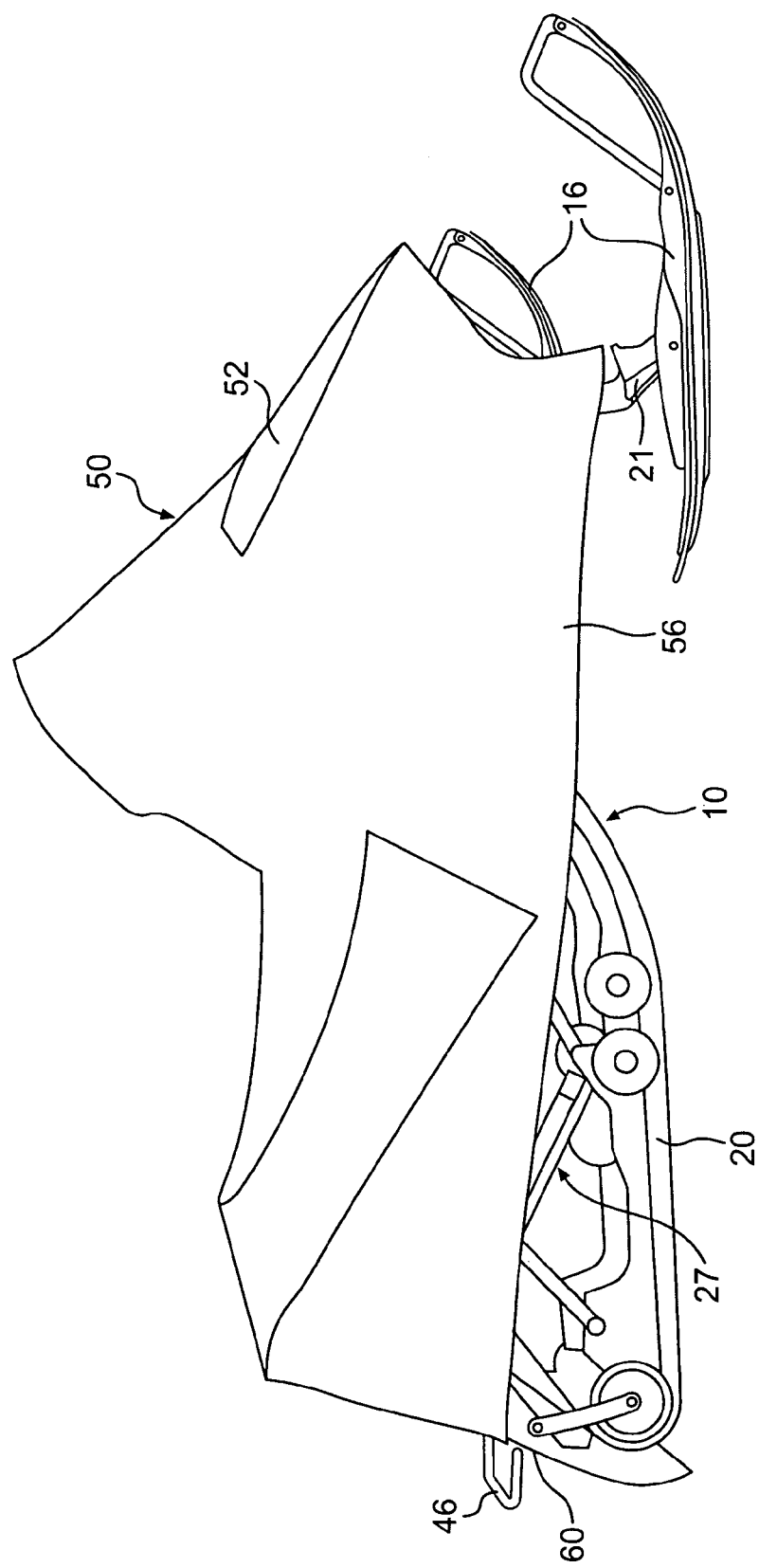
FIG. 3 is a side perspective view of a snowmobile having a protective cover in accordance with the present invention installed thereon.

The snowmobile protective cover 50 of the present invention, as shown in FIG. 3, generally comprises an upper weatherproof portion 52 which is preferably made of a soft flexible nylon, or a similarly weatherproof material which provides protection from the elements such as wind, precipitation, dirt, etc. The upper weatherproof portion 52 is sized to fit over the entire upper portion of the snowmobile 10. As best seen in FIG. 3, the upper weatherproof portion 52 is preferably fitted to accommodate the particular model of snowmobile for which the protective cover 50 is intended, such that the cover 50 can snugly envelope the outer surfaces of the vehicle. This further reduces the possibility of wind getting under the cover when installed on the snowmobile. With the protective cover 50 installed in place over the snowmobile 10, substantially most of the upper portion of the snowmobile is covered, such that protection from the elements is provided when the snowmobile 10 is being stored or transported. The upper weatherproof portion 52 of the protective cover 50 comprises a lower lip 56 which extends around the perimeter thereof, defining a large lower opening in the upper weatherproof portion 52. Accordingly, the protective cover 50 can be slid overtop of the snowmobile 10.

Figure 4:
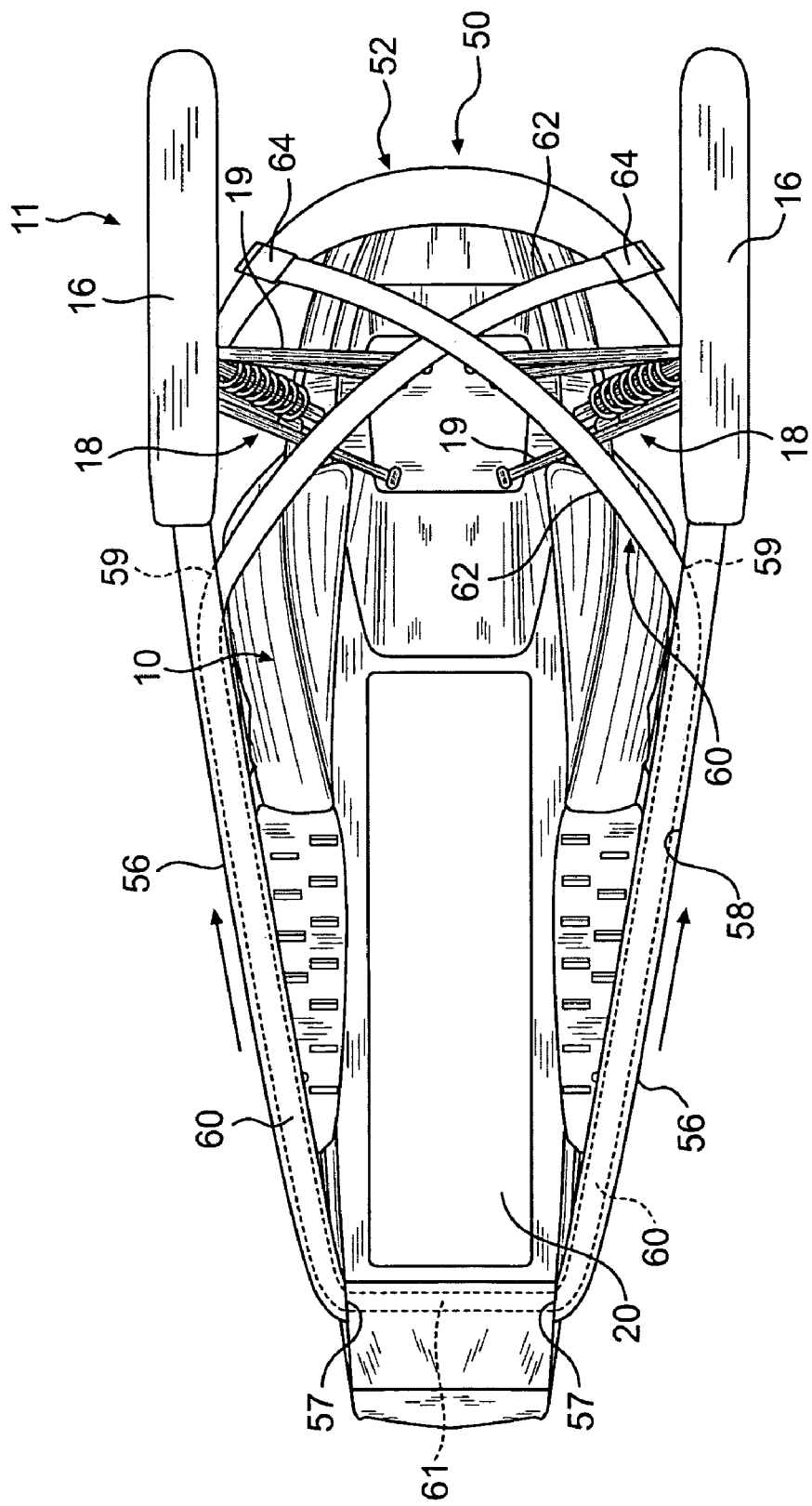
FIG. 4 is a bottom plan view of a snowmobile having the protective cover of FIG. 3 fastened thereto.

Referring now to FIG. 4, the attachment system used to secure the protective cover 50 to the snowmobile 10 is shown. In contrast to the protective cover 950 of the prior art described above and depicted in FIG. 2, a single continuous cover fastening strap 60 is used to securely fasten the protective cover 50 to the snowmobile 10. The lower lip 56 extending around the perimeter of the upper weatherproof portion 52 has a passage 58 formed therein. The passage 58 can be formed in any manner, such as by folding up and sewing the lower edge of the cover. The passage 58 extends preferably at least one-half way around the perimeter of the lower lip 56 and has forward openings 59 on opposed sides of the lower lip 56 near the forward end of the cover 50. The forward openings 59 in the lower lip 56 leading to the passage 58 are located therein such that when the cover 50 is installed overtop the snowmobile 10, the openings 59 are disposed behind the front suspension systems 18 on either side of the vehicle. The cover fastening strap 60 extends through the passage 58 in the lower lip 56 of the upper weatherproof portion 52, such that it extends around at least the rear half of the perimeter of the lower lip 56. Rearward openings 57 in the lower lip 56, leading to the passage 58, can also be defined therein and are disposed near the rear end of the lower lip 56, such that the fastening strap 60 can be exposed at the rear end of the upper weatherproof portion 52. This permits a rearward exposed portion 61 of the fastening strap 60 to be more easily hooked under the rear grab handle/bumper 46, or engaged with an alternate rear structure of the snowmobile. Although the fastening strap 60 is preferably a single continuous strap, it is to be understood that the term fastening strap as used herein also includes a strap having two separate portions. For example, two separate fastening strap portions can be fixed within the passage 58 at a rearward end thereof, and extend forward through the two sides of the passage 58 and out through the forward strap openings 59.

The fastening strap 60 comprises two opposed free end portions 62 which project outward from the forward strap openings 59 in the lower lip 56. Each of the forward free end portions 62 of the fastening strap 60 are adapted to be crossed over beneath the snowmobile 10 to the other side thereof for fastening to the opposite side of the upper weatherproof portion 52 of the cover 50 by fastening members 64, such as standard quick attach clips 64. Therefore, each end of the fastening strap 60 comprises a male or female half of such a quick attach clip 64, for mating with the other half thereof fixed to the opposite side of the upper weatherproof portion 52 ahead of the front suspension system 18 of the snowmobile 10. Therefore, the forward free end portions 62 of the fastening strap 60 are long enough such that they can be crossed over to the other side of the upper weatherproof portion, without having to pass ones hands under the vehicle.

As seen in FIG. 3 and FIG. 4, the forward openings 59, from which the free end portions 62 of the fastening strap 60 extend, are preferably disposed behind the ski legs 21, and the portions of the fastening members 64 fixed to the forward end of the upper weatherproof portion 52 are disposed forward of the ski legs 21. Particularly, the forward openings 59 are preferably disposed behind the front suspension systems 18, and the fastening members 64 are located forward thereof. The free ends 62 thereby overlap to form a cross having a first strap free end portion 62 extending from behind a right-hand ski leg to a point in front of a left-hand ski leg, and a second strap free end portion 62 extending from behind the left-hand ski leg to a point in front of the right-hand ski leg. While this is the preferred arrangement and position of the fastening strap 60 free ends 62 relative to the structure of the snowmobile 10, it is also possible to locate the portions of the fastening members 64 which are fixed to the upper weatherproof portion 52 behind the ski legs 21. In this case, the forward openings 59 are preferably located immediately forward of the front end of the drive track 20, and the attachment points of the fastening members 64 with the upper weatherproof portion 52 are located as far forward as possible, while remaining behind said ski legs 21, such that the cross formed by the overlapping free ends 62 covers the most area possible.

Once the protective cover 50 has been placed overtop of the snowmobile 10, the forward free ends 62 of the fastening strap 60 projecting from the forward strap openings 59 are disposed behind the front ski legs 21. Accordingly, in order to securely fasten the protective cover 50 on the snowmobile, the person installing the cover 50 thereon simply has to do the following: pass one of the forward free end portion 62 on a first side of the vehicle inside the ski leg 21 on that same side (which is easily done because the ski legs 21 are typically unobstructed and extend significantly outward from the side of the snowmobile); walk around the front of the vehicle to the opposite side thereof holding this end portion 62; and fasten this end portion 62 to the quick attach clip 64 located on the opposite side of the protective cover 50. The same procedure is then repeated with the remaining forward free end 62 of the fastening strap 60, such that both forward free ends 62 are secured to opposite sides of the protective cover 50 such that they cross over each other beneath the forward end 11 of the snowmobile 10.

The quick attach clips 64, which are used to removably fasten the free ends 62 of the fastening strap 60 to the front edge of the protective cover 50, preferably permit the ends of the strap 60 to be pulled, once the clips have been engaged, in order to shorten the length of strap between the two quick attach clips 63. This therefore tightens the entire fastening strap 60 around the snowmobile 10, pulling the perimeter of the lower lip 56 inward toward the snowmobile 10, such that wind is prevented from getting up under the protective cover 50.

It is to be understood that the reverse arrangement of the cover attachment can similarly be used, namely that the fastening strap passes through a passage which extends around the forward end of the protective cover and the free ends of the strap are exposed to cross over one another beneath the rear of the vehicle. However, this arrangement is not as preferable, as the user installing the protective cover would be required, much as with the covers of the prior art, to pass their arms through the rear suspension system of the snowmobile. Further, the protective cover 50 can generally be fastened more securely to the snowmobile 10 when the free ends 62 of the fastening strap 60 are crossed over each other at the forward end of the vehicle, as depicted in FIG. 4.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

What is claimed is:

1. A cover for protecting and covering at least an upper portion of a snowmobile, the cover comprising:
    an upper weatherproof portion having an elongated lower opening therein shaped to correspond to the snowmobile, and having a lower lip circumscribing the elongated lower opening and defining therein a passage extending at least partially there-around, the lower lip having strap openings communicating with the passage and disposed on each of opposed lateral sides of the lower lip;
    a fastening strap for securing the upper weatherproof portion to the snowmobile, the fastening strap being disposed within the passage and having free ends projecting out from the strap openings, each of the free ends of the fastening strap having a length which permits it to be crossed under the snowmobile and fastened to the upper portion on a lateral side thereof opposite from that of the strap opening from which the free end projects; and
    fastening members for removably attaching the free ends to the upper portion.

2. The cover as defined in claim 1, wherein the fastening strap is a single continuous strap.

3. The cover as defined in claim 1, wherein the passage extends at least half way around the lower lip.

4. The cover as defined in claim 1, wherein the fastening members are quick attach clips.

5. The cover as defined in claim 4, wherein one half of each quick attach clip is engaged to one of the free ends of the fastening strap, and mating other halves of each quick attach clip are fixed to the upper weatherproof portion.

6. The cover as defined in claim 4, wherein the quick attach clips, once fastened, permit the fastening strap to be tightened.

7. A weatherproof cover and snowmobile combination comprising:
    a snowmobile including
        a frame having an engine disposed thereon at a forward end thereof and a seat disposed on the frame behind the engine;
        two skis linked to the frame by a front suspension system;
        a drive track disposed below the frame and being operatively connected to the engine for propulsion of the snowmobile;
        a steering device disposed on the frame forward of the seat and being operatively connected to the skis for steering the snowmobile; and
    a cover for protecting and covering the snowmobile including
        an upper weatherproof portion defining an elongated lower opening therein shaped to correspond to the snowmobile and having a lower lip circumscribing the elongated lower opening, the lower lip defining therein a passage extending at least partially there-around and strap openings communicating with the passage and disposed on each of opposed lateral sides of the lower lip;
        a fastening strap for securing the upper weatherproof portion to the snowmobile, the fastening strap being disposed within the passage and having free ends projecting out from the strap openings, each of the free ends of the fastening strap having a length which permits it to be crossed under the snowmobile and fastened to the upper portion on a lateral side thereof opposite from that of the strap opening from which the free end projects; and
    fastening members for removably attaching the free ends to the upper portion.

8. The snowmobile and cover as defined in claim 7, wherein the free ends of the fastening strap cross over one another beneath a forward end of the snowmobile when the cover is installed thereon.

9. The snowmobile and cover as defined in claim 8, wherein the strap openings in the lower lip are disposed behind the front suspension system of the snowmobile.

10. The snowmobile and cover as defined in claim 9, wherein a portion of each fastening member is fixed to the upper weatherproof portion forward of the front suspension systems.

11. The cover as defined in claim 7, wherein the fastening strap is a single continuous strap.

12. The cover as defined in claim 7, wherein the passage extends at least half way around the lower lip of the upper weatherproof portion.

13. The cover as defined in claim 1, wherein the fastening members are quick attach clips.

14. The cover as defined in claim 13, wherein one half of each quick attach clip is engaged to one of the free ends of the fastening strap, and a mating other half of each quick attach clip is fixed to the upper weatherproof portion.

15. The cover as defined in claim 13, wherein the quick attach clips, once fastened, permit the fastening strap to be tightened.

16. A method of installing a cover on a snowmobile comprising the steps of:
    providing a cover for protecting and covering at least an upper portion of the snowmobile, the cover having an upper weatherproof portion defining an elongated lower opening therein shaped to correspond to the snowmobile and having a lower lip circumscribing the elongated lower opening, the lower lip defining therein a passage extending at least partially there-around, the cover comprising a fastening strap for securing the upper weatherproof portion to the snowmobile, the fastening strap being disposed within the passage and having free ends projecting outward from strap openings defined in lateral sides of the lower lip;
    sliding the upper weatherproof portion over the snowmobile;
    engaging an end of the upper weatherproof portion having the passage therein to a first end of the snowmobile;
    crossing both of the free ends of the fastening strap beneath a second end of the snowmobile; and
    removably fastening each of the free ends of the fastening strap to the upper weatherproof portion on a lateral side thereof opposite that of the strap opening from which the free end projects.

17. The cover as defined in claim 1, wherein the strap openings further include forward openings and rearward openings, such that the strap is exposed between the rearward openings.

18. The cover as defined in claim 17, wherein the rearward openings are positioned on opposed lateral sides of the upper portion to the rear of the forward openings.

* * * * *